United States Patent
Hikosaka et al.

(10) Patent No.: US 7,106,532 B2
(45) Date of Patent: Sep. 12, 2006

(54) HARD DISK UNIT, INFORMATION PROCESSING METHOD AND PROGRAM

(75) Inventors: Masaaki Hikosaka, Tokyo (JP); Hiroto Handa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 126 days.

(21) Appl. No.: 10/808,430

(22) Filed: Mar. 25, 2004

(65) Prior Publication Data

US 2004/0190181 A1 Sep. 30, 2004

(30) Foreign Application Priority Data

Mar. 31, 2003 (JP) ............................ P2003-094638

(51) Int. Cl.
*G11B 5/09* (2006.01)
*G11B 19/02* (2006.01)

(52) U.S. Cl. .................... 360/39; 360/69; 713/189; 713/150

(58) Field of Classification Search ..................... None
See application file for complete search history.

(56) References Cited

U.S. PATENT DOCUMENTS 6,397,333 B1 * 5/2002 Sohne et al. ................ 713/176
6,859,789 B1 * 2/2005 Hayashi et al. ............... 705/50
2003/0188162 A1 * 10/2003 Candelore et al. .......... 713/169
2004/0255134 A1 * 12/2004 Miyamoto .................. 713/193

FOREIGN PATENT DOCUMENTS

JP        2000-311114        11/2000

* cited by examiner

*Primary Examiner*—Andrew L. Sniezek
(74) *Attorney, Agent, or Firm*—McGinn IP Law Group, PLLC

(57) ABSTRACT

In a hard disk unit, a disassembling and assembling unit disassembles and assembles data in accordance with the size of data to be written from host equipment to the hard disk unit and a sector size and a cluster size as a unit to be read or written. An encoder performs predetermined arithmetic operation to generate a specific bit string as an encoding key based on at least the identification information on the host equipment or on a CPU of the host equipment, and encodes the write data by using the encoding key. The encoding process is performed by flipping bits having a predetermined correspondence with the contents of the encoding.

20 Claims, 3 Drawing Sheets

HARD DISK UNIT, INFORMATION PROCESSING METHOD AND PROGRAM

BACKGROUND OF THE INVENTION

1. Field of the Invention

The present invention relates to a hard disk unit, an information processing method and a program which provide excellent data security by encoding write data with an encoding key specific to host equipment.

2. Description of the Related Art

In recent years, with the progress of information processing technology and high-accuracy magnetic recording technology, a hard disk unit has been in widespread use as a large-capacity external storage which is connected to or mounted on various information equipment (hereinafter referred to as host equipment) such as a personal computer or a car navigation system and which is used for reading and writing data.

On such a hard disk unit, file-based encoding has been made or input of an ID or a password specific to a user has been requested for authentication by a BIOS, an OS, or an application program in order to protect copyrighted material including an image, a music, a moving picture and an application program as well as personal information and secret information on business from illegal duplication or unauthorized duplication by a third party (see JP-A-2000-311114).

SUMMARY OF THE INVENTION

However, it is cumbersome for the user to input a password as required and file-based protection does not protect the contents of entire the hard disk. For example, in case the hard disk is removed from the host equipment and used as a standalone unit, the above data protection could be violated.

The invention has been achieved to solve the above-mentioned problem, and one of objects of the invention is to provide a hard disk unit, an information processing method and a program which provide excellent data security by encoding write data with an encoding key specific to host equipment.

In order to achieve the above object, according to a first aspect of the invention, there is provided a hard disk unit that performs reading and writing data in response to an access from a host equipment, the hard disk unit including: an encoder that generates a specific bit string as an encoding key by performing a predetermined arithmetic operation using at least one of identification information relating to the host equipment and identification information relating to a controller device of the host equipment, and encodes data that is to be written with the encoding key; and a recording unit that records the data encoded by the encoder.

According to a second aspect of the invention, there is provided an information processing method using a hard disk unit that performs reading and writing data in response to an access from a host equipment, the method including: generating a specific bit string as an encoding key by performing a predetermined arithmetic operation using at least one of identification information relating to the host equipment and identification information relating to a controller device of the host equipment; encoding data that is to be written with the encoding key; and recording the encoded data.

According to a third aspect of the invention, there is provided a information processing program for controlling a computer to perform reading and writing data on and from a hard disk unit in response to an access from a host equipment, the program including: generating a specific bit string as an encoding key by performing a predetermined arithmetic operation using at least one of identification information relating to the host equipment and identification information relating to a controller device of the host equipment; encoding data that is to be written with the encoding key; and recording the encoded data.

BRIEF DESCRIPTION OF THE DRAWINGS

These and other objects and advantages of the present invention will become more fully apparent from the following detailed description taken with the accompanying drawings, in which.

DETAILED DESCRIPTION OF THE PREFERRED EMBODIMENTS

Referring now to the accompanying drawings, a description will be given in detail of preferred embodiments according to the invention.

1. Configuration of a First Embodiment

Figure 1:
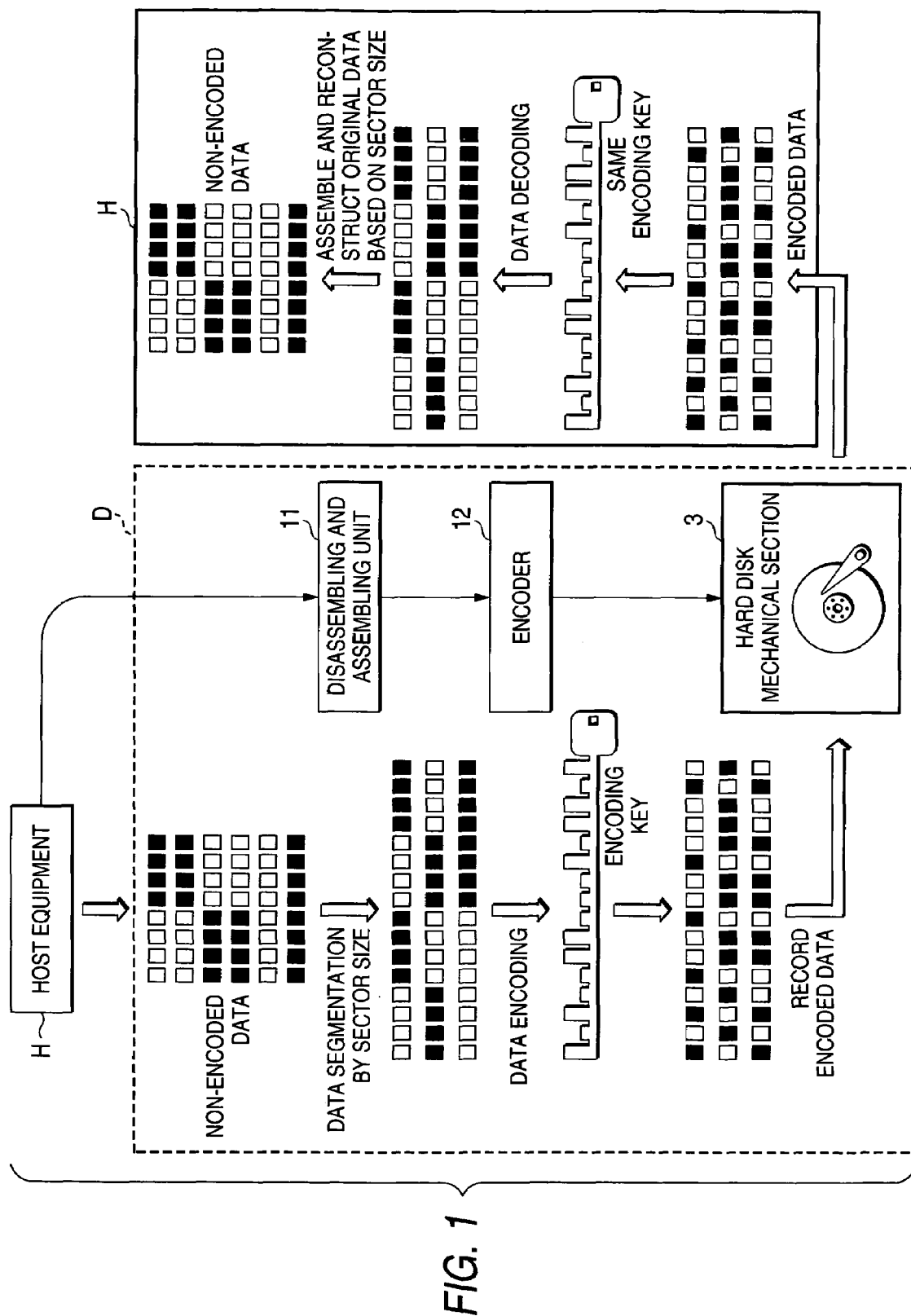
FIG. 1 is a functional block diagram showing a state of data encoding and decoding according to a first embodiment according to the invention.

As shown in FIG. 1, a first embodiment relates to a hard disk unit D that performs data read and data write in response to an access from host equipment H and an information processing method using the hard disk unit D. Incidentally, the method used in the hard disk unit D, which will be described hereinafter, may also be implemented in a form of an information processing program executed by a computer.

The hard disk unit D includes a disassembling and assembling unit 11, an encoder 12 and a hard disk mechanical section 3. The hard disk mechanical section 3 includes a spindle motor and a head seeking mechanism. The disassembling and assembling unit 11 and the encoder 12 are units which are implemented by a program for a controller CPU or an electronic circuit such as an FPGA and operates as mentioned below.

2. Operation of the First Embodiment

The disassembling and assembling unit 11 disassembles and assembles data in accordance with the size of data to be written from host equipment H to the hard disk unit D, a sector size, and a cluster size.

The encoder 12 performs predetermined arithmetic operation to generate a specific bit string as an encoding key based on at least the identification information on the host equipment H or the CPU of the host equipment H, as well as encodes the write data by using the encoding key. The encoding process is to flip the bits having a predetermined correspondence with the contents of the encoding key per unit of data to read or write. The data shown in FIG. 1 is a simplified example where the value of each bit in the same position as that having a value of "1" with the encoding key is flipped for encoding.

As an example, the encoder 12 performs arithmetic operation of the user ID registered to the host equipment H, the serial number of the CPU (controller device) of the host equipment H, and the serial number of the hard disk unit D and calculates a number specific to a combination as an encoding key. By using a unit the minimum unit sector of data read/write of the hard disk unit D, that is, 1 sector=512 bytes=4096 bits, the encoder 12 performs bit flip operation specific to a combination of an individual hard disk unit D and an individual unit of host equipment H on predetermined bits of an arbitrary number determined in accordance with the encoding key. Repeating the same operation using the same encoding key performs decoding. Encoding and decoding processes are described below.

In the data write process, non-encoded data is transmitted from the host equipment H to the hard disk unit D. In the hard disk unit D, the disassembling and assembling unit 11 segments the data into sectors and the encoder 12 encodes data per segmented data length. The encoded data is recorded sector by sector into the hard disk mechanical section 3.

In the data read process, encoded data read from the hard disk unit D is transferred to the host equipment H. The encoded key is also passed to the host equipment H. The host equipment H which has received data decodes the data by the size of sector with decoding and combines or segments the data in the sectors to reconstructs the original data.

3. Advantages of the First Embodiment

Figure 2:
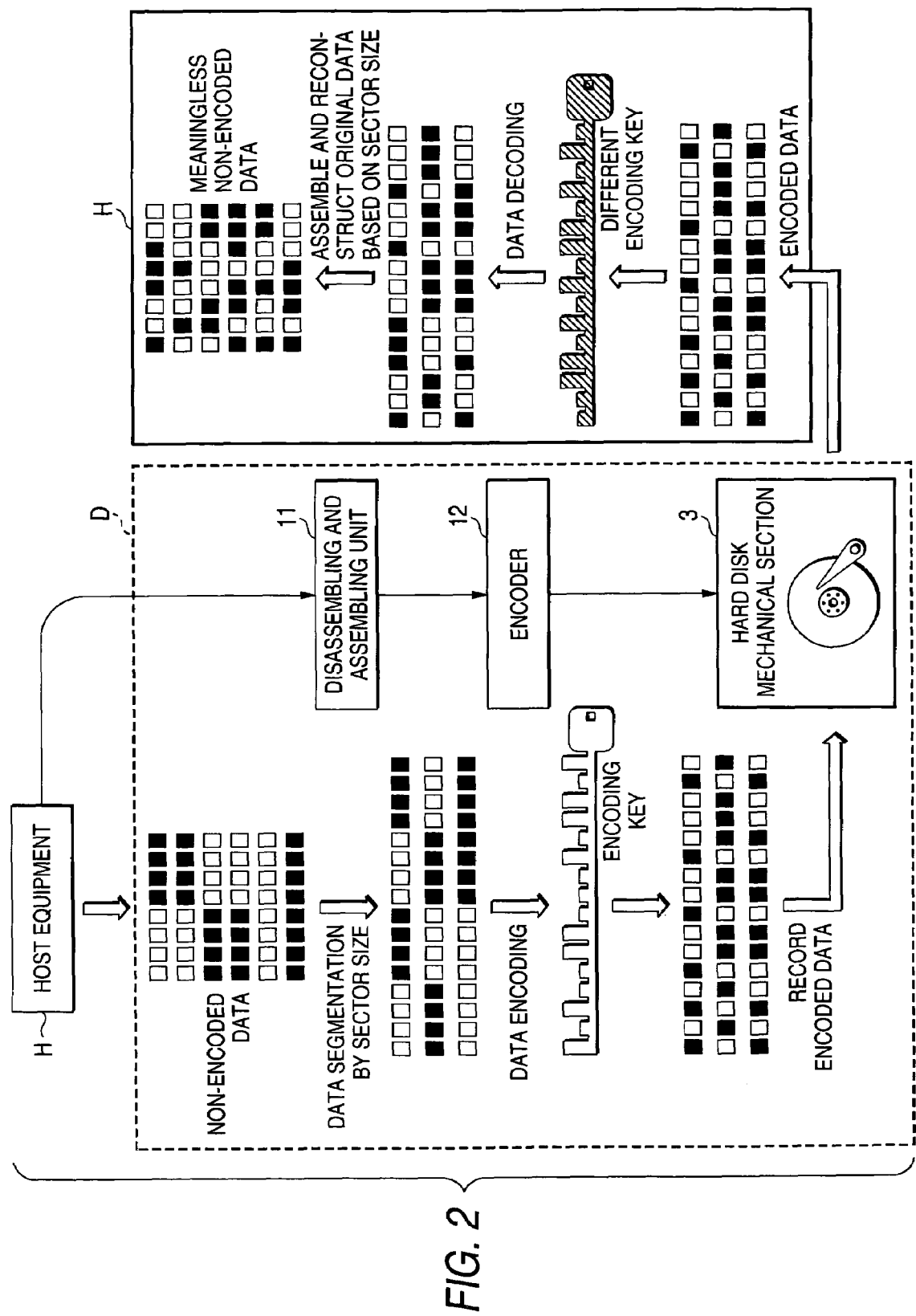
FIG. 2 is a functional block diagram showing a state where the data encoded in the first embodiment is not normally decoded.

As mentioned hereinabove, the first embodiment calculates a bit string such as an encoding key or a number with predetermined arithmetic operation from identification information such as a serial number specific to host equipment or a CPU of the host equipment, and encodes the write data based on the calculated bit string. Thus, only meaningless data or encoded data is obtained even in case the hard disk unit is connected to equipment other than the host equipment from which data is written and data is read, including a case where a hard disk unit is stolen (see FIG. 2). Accordingly, illegal data duplication of personal information, secret information on business and copyrighted material is prevented, thereby assuring excellent data security.

The first embodiment is advantageous in that both encoding and decoding are made using a simple technique of flipping arbitrary bits determined by predetermined correspondence from the encoding key.

According to the first embodiment, identification information such as the serial number of a hard disk and user identification information such as a predetermined user ID are also used to generate an encoding key. Therefore, it is more difficult for a third party to break an encoding key thus improving the data security.

4. Second Embodiment

Figure 3:
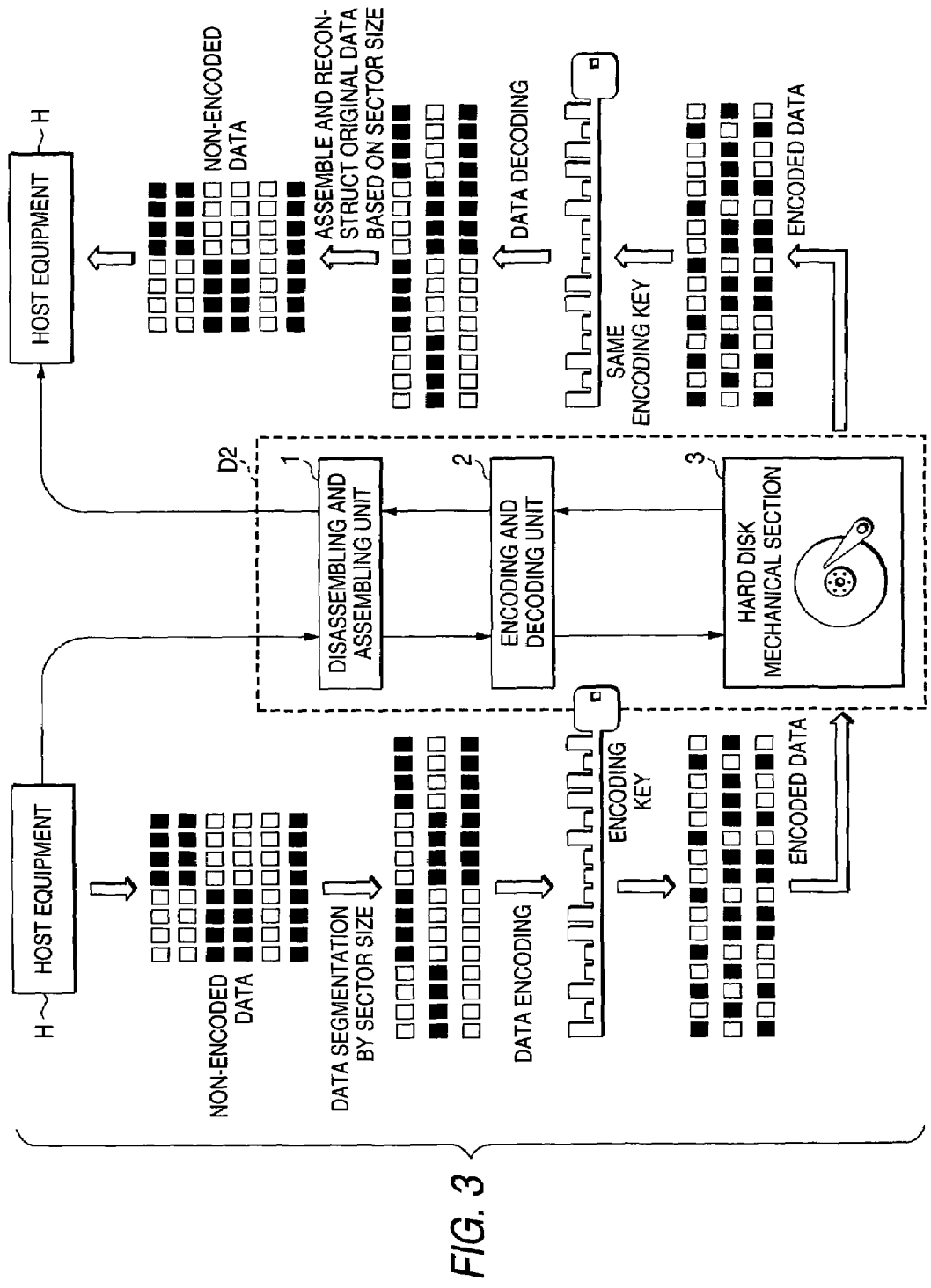
FIG. 3 shows a second embodiment according to the invention.

As a second embodiment, a hard disk unit may also perform decoding as shown in FIG. 3. In the second embodiment, identification information which is based on the host equipment H is used for encoding. This assures excellent data security.

In the second embodiment, a disassembling and assembling unit 1 performs decoding as well. An encoding and decoding unit 2 performs predetermined arithmetic operation based on the identification information on the host equipment H or a CPU of the host equipment H, as well as encodes the write data by using the encoding key. The encoding process is to flip the bits having a predetermined correspondence with the contents of the encoding key per data read unit and data write unit.

The encoding and decoding unit 2, reading the data written using such an encoding process, flips the bits having a predetermined correspondence with the contents of the encoding key per data read/write unit, same as in the data write process, to perform decoding.

5. Other Embodiments

The invention is not limited to the above-described embodiments but includes other exemplary embodiments described below. For example, any known arithmetic operation to generate an encoding key from identification information may be employed. Encoding may be halted in case a predetermined cancellation code is input. Data write encoding is canceled and data duplication to another recording medium is allowed only in case a predetermined cancellation key such as a user ID is input. The above described configuration enhances the range of application of the invention.

Advantage of the Invention

As mentioned hereinabove, the invention provides a hard disk unit, an information processing method and a program which provide excellent data security by encoding write data with an encoding key specific to host equipment.

As described hereinabove, according to a first aspect of the invention, there is provided a hard disk unit that performs reading and writing data in response to an access from a host equipment, the hard disk unit including: an encoder that generates a specific bit string as an encoding key by performing a predetermined arithmetic operation using at least one of identification information relating to the host equipment and identification information relating to a controller device of the host equipment, and encodes data that is to be written with the encoding key; and a recording unit that records the data encoded by the encoder.

According to a sixth aspect of the invention, there is provided an information processing method using a hard disk unit that performs reading and writing data in response to an access from a host equipment, the method including: generating a specific bit string as an encoding key by performing a predetermined arithmetic operation using at least one of identification information relating to the host equipment and identification information relating to a controller device of the host equipment; encoding data that is to be written with the encoding key; and recording the encoded data.

According to an eleventh aspect of the invention, there is provided an information processing program for controlling a computer to perform.reading and writing data on and from a hard disk unit in response to an access from a host equipment, the program including: generating a specific bit string as an encoding key by performing a predetermined arithmetic operation using at least one of identification information relating to the host equipment and identification information relating to a controller device of the host equipment; encoding data that is to be written with the encoding key; and recording the encoded data.

According to the first, the sixth, and the eleventh aspects of the invention, a bit string such as an encoding key or a number is calculated and write data is encoded based on the bit string with predetermined arithmetic operation from identification information such as a serial number specific to host equipment or the CPU of the host equipment. Thus, only meaningless data or encoded data is obtained even in case the hard disk is connected to equipment other than the host equipment from which data is written and data is read, including a case where a hard disk unit is stolen. Accordingly, illegal data duplication of personal information, secret information on business and copyrighted material is prevented, thereby assuring excellent data security.

According to a second aspect of the invention, in addition to the first aspect of the invention, the encoder flips bits in each of a data unit to be written, the bits having predetermined correspondence with content of the encoding key.

According to a seventh aspect of the invention, in addition to the sixth aspect of the invention, the encoding of the data is performed by flipping bits in each of a data unit to be written, the bits having predetermined correspondence with content of the encoding key.

According to a twelfth aspect of the invention, in addition to the eleventh aspect of the invention, the encoding of the data is performed by flipping bits in each of a data unit to be written, the bits having predetermined correspondence with content of the encoding key.

According to the second, the seventh, and the twelfth aspects of the inventions the encoding is made using a simple technique of flipping arbitrary bits determined by predetermined correspondence from the encoding key.

According to a third aspect of the invention, in addition to the first aspect of the invention, the encoder generates the encoding key by performing a predetermined arithmetic operation using at least one of the identification information relating to the host equipment and the identification information relating to the controller device of the host equipment, and at least one of identification information relating to the hard disk unit and predetermined identification information relating to a user.

According to an eighth aspect of the invention, in addition to the sixth aspect of the invention, the generating of the encoding key is performed by a predetermined arithmetic operation using at least one of the identification information relating to the host equipment and the identification information relating to the controller device of the host equipment, and at least one of identification information relating to the hard disk unit and predetermined identification information relating to a user.

According to a thirteenth aspect of the invention, in addition to the eleventh aspect of the invention, the generating of the encoding key is performed by a predetermined arithmetic operation using at least one of the identification information relating to the host equipment and the identification information relating to the controller device of the host equipment, and at least one of identification information relating to the hard disk unit and predetermined identification information relating to a user.

According to the third, the eighth, and the thirteenth aspects of the invention, identification information such as the serial number of a hard disk and user identification information such as a user ID are used as a basis of generation of an encoding key. According to the above configuration, it is more difficult for a third party to break an encoding key thus improving the data security.

According to a fourth aspect of the invention, in addition to the first aspect of the invention, the encoder halts to encode the data in a case where a predetermined cancellation code is input.

According to a ninth aspect of the invention, in addition to the sixth aspect of the invention, the encoding of the data is halted in a case where a predetermined cancellation code is input.

According to a fourteenth aspect of the invention, in addition to the eleventh aspect of the invention, the encoding of the data is halted in a case where a predetermined cancellation code is input.

According to the fourth, the ninth, the fourteenth aspects of the invention, data write encoding is canceled and data duplication to another recording medium is allowed only in case a predetermined cancellation key such as a user ID is input. Accordingly, the range of application of the invention may be enhanced.

According to a fifth aspect of the invention, in addition to the second aspect of the invention, the hard disk unit further includes a decoder that decodes the encoded data recorded in the recording unit by flipping bits in each of the data unit, the bits having the predetermined correspondence with content of the encoding key.

According to a tenth aspect of the invention, in addition to the seventh aspect of the invention, the method further includes decoding the encoded data by flipping bits in each of the data unit, the bits having the predetermined correspondence with content of the encoding key.

According to a fifteenth aspect of the invention, in addition to the twelfth aspect of the invention, the program further includes decoding the encoded data by flipping bits in each of the data unit, the bits having the predetermined correspondence with content of the encoding key.

According to the fifth, the tenth, and the fifteenth aspects of the invention, decoding is made using a simple technique of flipping arbitrary bits determined by predetermined correspondence from the encoding key.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A hard disk unit that performs reading and writing data in response to an access from a host equipment, the hard disk unit comprising:
   an encoder that generates a specific bit string as an encoding key by performing a predetermined arithmetic operation using at least one of identification information relating to the host equipment and identification information relating to a controller device of the host equipment, and encodes data that is to be written with the encoding key; and
   a recording unit that records the data encoded by the encoder.

2. The hard disk unit according to claim 1, wherein the encoder flips bits in each of a data unit to be written, the bits having predetermined correspondence with content of the encoding key.

3. The hard disk unit according to claim 2, further comprising a decoder that decodes the encoded data recorded in the recording unit by flipping bits in each data unit, the bits having the predetermined correspondence with content of the encoding key.

4. The hard disk unit according to claim 1, wherein the encoder generates the encoding key by performing a predetermined arithmetic operation using at least one of the identification information relating to the host equipment and the identification information relating to the controller device of the host equipment, and at least one of identification information relating to the hard disk unit and predetermined identification information relating to a user.

5. The hard disk unit according to claim 1, wherein the encoder halts to encode the data in a case where a predetermined cancellation code is input.

6. The hard disk unit of claim 1, wherein said hard disk unit comprises an external hard drive.

7. The hard disk unit of claim 1, further comprising a disassembling and assembling unit that disassembles and assembles data in accordance with the size of data to be written from the host equipment to a hard disk, a sector size, and a cluster size.

8. The hard disk unit of claim 1, further comprising a housing that houses said encoder and said recording unit.

9. The hard disk unit of claim 8, wherein said housing of said hard disk unit is external to a housing of said host equipment.

10. The hard disk unit of claim 1, wherein said encoder generates said encoding key based upon one of a serial number of a controller for the host equipment and a serial number of the hard disk unit.

11. A signal bearing medium containing a sequence of instructions for a program executable by a digital data processing unit for reading and writing data on and from a hard disk unit in response to an access from a host equipment, the program comprising:

instructions for generating, in said hard disk unit, a specific bit string as an encoding key by performing a predetermined arithmetic operation using at least one of identification information relating to the host equipment and identification information relating to a controller device of the host equipment;

instructions for encoding, in said hard disk unit, data that is to be written with the encoding key; and instructions for recording, in said hard disk unit, the encoded data.

12. The medium of claim 11, wherein the encoding of the data is performed by flipping bits in each of a data unit to be written, the bits having predetermined correspondence with content of the encoding key.

13. The medium of claim 12, further comprising instructions for decoding the encoded data by flipping bits in each of the data unit, the bits having the predetermined correspondence with content of the encoding key.

14. The medium of claim 11, wherein the instructions for generating of the encoding key comprises instructions for performing a predetermined arithmetic operation using at least one of the identification information relating to the host equipment and the identification information relating to the controller device of the host equipment, and at least one of identification information relating to the hard disk unit and predetermined identification information relating to a user.

15. The medium of claim 11, wherein the instructions for encoding of the data comprise instructions for halting in a case where a predetermined cancellation code is input.

16. An information processing method using a hard disk unit that performs reading and writing data in response to an access from a host equipment, the method comprising:

generating, in said hard disk unit, a specific bit string as an encoding key by performing a predetermined arithmetic operation using at least one of identification information relating to the host equipment and identification information relating to a controller device of the host equipment;

encoding, in said hard disk unit, data that is to be written with the encoding key; and recording, in said hard disk unit, the encoded data.

17. The information processing method according to claim 16, wherein the encoding of the data is performed by flipping bits in each of a data unit to be written, the bits having predetermined correspondence with content of the encoding key.

18. The information processing method according to claim 17, further comprising decoding the encoded data by flipping bits in each of the data unit, the bits having the predetermined correspondence with content of the encoding key.

19. The information processing method according to claim 16, wherein the generating of the encoding key is performed by a predetermined arithmetic operation using at least one of the identification information relating to the host equipment and the identification information relating to the controller device of the host equipment, and at least one of identification information relating to the hard disk unit and predetermined identification information relating to a user.

20. The information processing method according to claim 16, wherein the encoding of the data is halted in a case where a predetermined cancellation code is input.

* * * * *